US008770677B2

(12) United States Patent
Yelistratov

(10) Patent No.: US 8,770,677 B2
(45) Date of Patent: Jul. 8, 2014

(54) COMPOUND RIM ASSEMBLY FOR IDLER IN AN UNDERCARRIAGE SYSTEM OF A TRACK-TYPE MACHINE

(75) Inventor: Alexei P. Yelistratov, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 741 days.

(21) Appl. No.: 12/974,474

(22) Filed: Dec. 21, 2010

(65) Prior Publication Data

US 2012/0153714 A1   Jun. 21, 2012

(51) Int. Cl.
*B62D 55/14* (2006.01)
*B62D 55/32* (2006.01)

(52) U.S. Cl.
USPC .......................................... 305/137

(58) Field of Classification Search
CPC ....... B62D 55/14; B62D 55/145; B62D 55/32
USPC ......... 305/137, 194, 195, 196, 197, 199, 200, 305/136; 474/190
See application file for complete search history.

(56) References Cited

U.S. PATENT DOCUMENTS

| 306,070 | A | | 10/1884 | Ferguson | |
|---|---|---|---|---|---|
| 1,258,607 | A | | 3/1918 | Holt | |
| 3,490,285 | A | * | 1/1970 | Donath et al. | 474/187 |
| 3,603,650 | A | | 9/1971 | Miller | |
| 3,937,528 | A | | 2/1976 | Clemens et al. | |
| 3,958,837 | A | | 5/1976 | Chagawa | |
| RE30,039 | E | | 6/1979 | Clemens et al. | |
| 4,818,041 | A | | 4/1989 | Oertley | |
| 5,207,489 | A | * | 5/1993 | Miller | 305/137 |
| 6,012,784 | A | | 1/2000 | Oertley | |
| 6,631,961 | B1 | | 10/2003 | Bedford et al. | |
| 6,739,678 | B2 | * | 5/2004 | Moebs et al. | 305/136 |
| 7,905,559 | B2 | * | 3/2011 | Angot et al. | 305/199 |
| 2005/0253453 | A1 | | 11/2005 | Miller | |
| 2010/0102623 | A1 | | 4/2010 | Mulligan | |
| 2010/0133898 | A1 | | 6/2010 | Johannsen et al. | |

FOREIGN PATENT DOCUMENTS

| GB | 1502208 | 2/1978 |
|---|---|---|
| JP | 1975033429 | 4/1975 |
| JP | 53079739 | 7/1978 |
| JP | 56138068 | 10/1981 |
| JP | 57066077 | 4/1982 |
| JP | 60196278 | 10/1985 |

* cited by examiner

*Primary Examiner* — Kip T Kotter
(74) *Attorney, Agent, or Firm* — Liell & McNeil

(57) ABSTRACT

A compound rim assembly for a rotatable idler in an undercarriage system of a track-type machine includes a one-piece annular base configured for mounting the compound annular rim assembly upon an outer peripheral surface of an idler hub. The one-piece annular base is formed of a relatively lower hardness metallic material, and the compound rim assembly further includes a first annular track contacting rim a second annular track contacting rim positioned upon the one-piece base and being formed of a relatively higher hardness metallic material. The compound rim assembly further includes a track guiding ring trapped axially between the first and second annular track contacting rims and abutting the outer cylindrical surface of the one-piece annular base, the track guiding ring being formed of a non-metallic material and projecting radially outward of the first and second annular track contacting rims.

15 Claims, 5 Drawing Sheets

COMPOUND RIM ASSEMBLY FOR IDLER IN AN UNDERCARRIAGE SYSTEM OF A TRACK-TYPE MACHINE

TECHNICAL FIELD

The present disclosure relates generally to rotatable idlers of the type used in connection with track-type machines, and more particularly to a compound rim assembly for an idler.

BACKGROUND

Track-type machines are used in a wide variety of rugged service environments. The use of ground engaging tracks rather than wheels can provide enhanced traction, stability, and robustness to a machine system over what might otherwise be available. Mining, construction, landfills, forestry, and still other service environments are notable examples of where track-type machines are advantageously used. A typical undercarriage system in a track-type machine includes a plurality of track shoes coupled together in an endless track chain by way of a set of track links, and extending about a drive sprocket and one or more rotatable idlers. Many undercarriage system components experience metal-on-metal wear during service. In addition, abrasive materials are present at most worksites where track-type machines are used. The metal-on-metal contact between and among undercarriage system components, exacerbated by abrasive materials, can subject undercarriage systems to substantial wear.

Rotation of the one or more drive sprockets and idler against components of the track such as the track links and/or track shoes, and particularly where abrasive materials intrude between the drive sprocket or idler and the track, can wear away material such that dimensions, contact patterns, and other geometric properties of the subject components tend to change over time. Many undercarriage systems include mechanisms adapted to compensate for wear and the resulting geometric changes. Various types of idler recoil systems are used in track-type machines at least in part to maintain a tensioned state of the track, while allowing chunks of debris such as rocks and the like to occasionally pass between the rotating idler and the track links or track shoes. Such idler recoil systems may inherently, or by way of manual adjustments, compensate for the wear induced geometric changes mentioned above. For instance, over time an outer surface of a rotatable idler can lose material such that a diameter of the idler is reduced. Where equipped with an idler recoil system, an actuator or other compensating mechanism can "push" the idler against the track such that a suitable tensioned state of the track is maintained despite a reduction in idler diameter or other wear induced geometric changes.

Although the use of idler recoil systems and the like can extend track service life over what might otherwise be possible, eventually wear on the idler and/or other undercarriage system components necessitates track servicing or rebuild if efficient use of the machine, and in some cases any use, is to continue. For reasons which will be readily apparent, it is desirable upon rebuild or servicing to reuse at least some of the undercarriage system components rather than purchasing all new parts. To this end, rotatable idlers which have been subjected to field service wear may sometimes be repaired and/or remanufactured. One technique for returning a worn idler to a condition suitable for returning to service involves adding material to an outer surface of the worn idler to return the idler to a size and/or shape similar to that of a new idler. Repair technicians may perform a very labor intensive process known in the art as "hard facing" in which numerous layers of material are deposited one upon the other on the outer surface of the idler. While in many instances a hard facing process can be economically superior over purchasing a new idler, idlers repaired in this manner may have reduced robustness and greater susceptibility to certain types of wear than a new idler, and suffer from other shortcomings.

SUMMARY OF THE DISCLOSURE

In one aspect, a compound rim assembly for a rotatable idler in an undercarriage system of a track-type machine includes a one-piece annular base configured for mounting the compound annular rim assembly upon an outer peripheral surface of an idler hub. The one-piece annular base is formed of a relatively lower hardness metallic material, and includes a cylindrical inner surface defining a center axis, a cylindrical outer surface concentric with the cylindrical inner surface, and a first and a second axial end surface. The one-piece annular base further includes an axial thickness between the first and second axial end surfaces, and a radial thickness between the inner and outer cylindrical surfaces, the radial thickness being less than the axial thickness. The compound rim assembly further includes a first annular track contacting rim positioned upon the outer cylindrical surface at a location adjacent the first axial end surface, and a second annular track contacting rim positioned upon the outer cylindrical surface at a location adjacent the second axial end surface. Each of the first and second annular track contacting rims is formed of a relatively higher hardness metallic material and is welded to the one-piece annular base. The compound rim assembly further includes a track guiding ring trapped axially between the first and second annular track contacting rims and abutting the outer cylindrical surface of the one-piece annular base, the track guiding ring being formed of a non-metallic material and projecting radially outward of the first and second annular track contacting rims.

In another aspect, a remanufactured idler for an undercarriage system in a track-type machine includes a hub having an outer peripheral surface, an inner peripheral surface defining an idler mounting bore, and a compound rim assembly mounted upon the hub. The compound rim assembly includes a first annular track contacting rim, a second annular track contacting rim, and a track guiding ring. A weld attaches the compound rim assembly to the hub. The hub is formed of a relatively lower hardness metallic material, the first and second annular track contacting rims are formed of a relatively higher hardness metallic material, and the track guiding ring is formed of a non-metallic material. The track guiding ring is trapped axially between the first and second annular track contacting rims, and projects radially outward of the first and second annular track contacting rims.

In still another aspect, an undercarriage system for a track-type machine includes a ground engaging track having a plurality of track shoes, a plurality of track links coupling together the track shoes in an endless track chain, and a plurality of track pins coupled with the track links. The undercarriage system further includes an idler for the ground engaging track having an idler body including a hub formed of a relatively lower hardness metallic material, and a compound rim assembly mounted upon the hub. The compound rim assembly includes a first annular track contacting rim, a second annular track contacting rim, and a track guiding ring. A weld attaches the compound rim assembly to the hub. The hub is formed of a relatively lower hardness metallic material, the first and second annular track contacting rims are formed of a relatively higher hardness metallic material, and the track guiding ring is formed of a non-metallic material. The track guiding ring is trapped axially between the first and second annular track contacting rims, and projects radially outward of the first and second annular track contacting rims such that the track guiding ring contacts the plurality of track pins.

DETAILED DESCRIPTION

Figure 1:
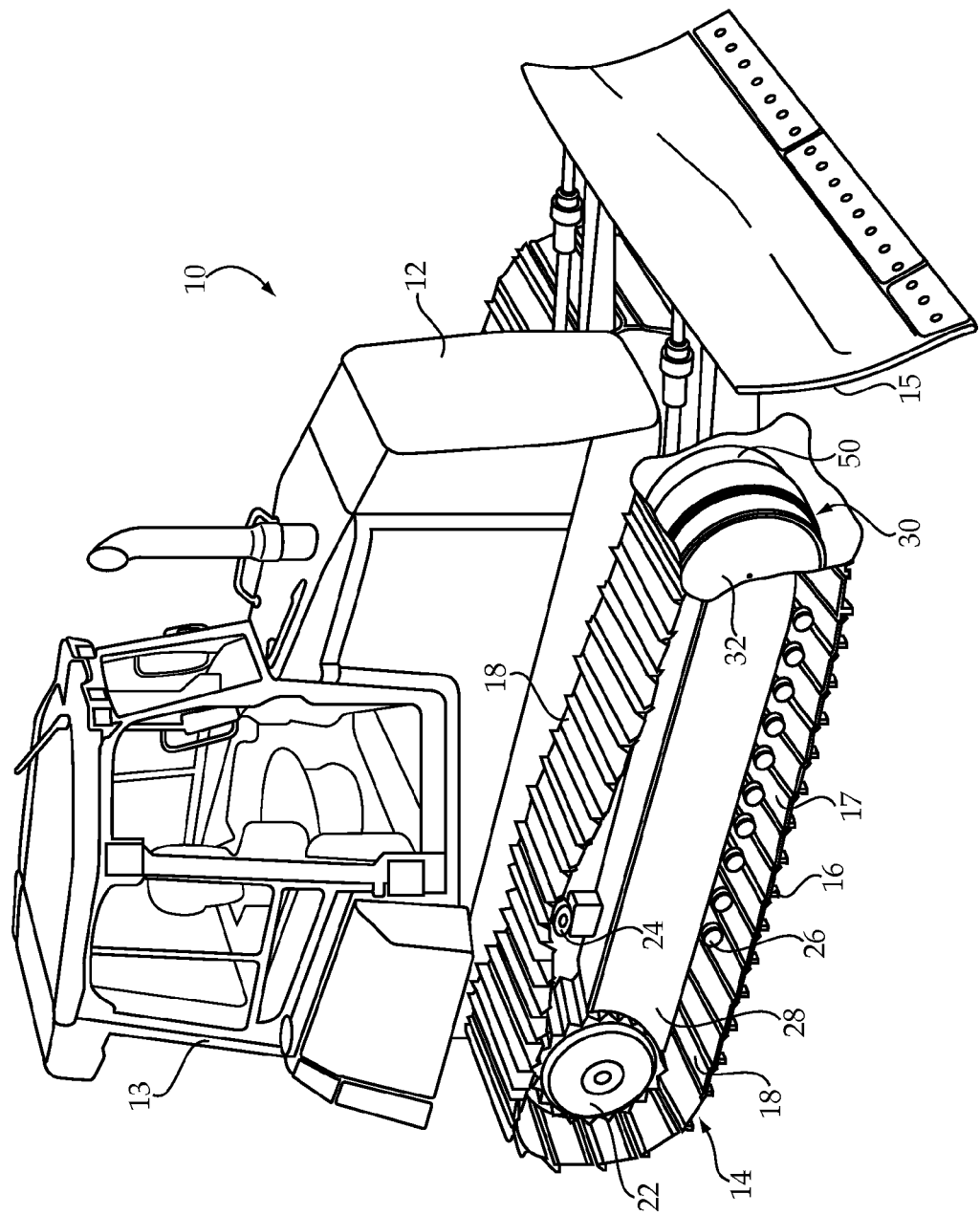
FIG. 1 is a diagrammatic view of a machine according to one embodiment.

Referring to FIG. 1, there is shown a machine 10 according to one embodiment. Machine 10 includes a frame 12, and an undercarriage system 14 coupled with frame 12. An operator cab 13 is positioned upon frame 12, and an implement 15 is also coupled with frame 12. Machine 10 is shown in the context of a track-type tractor, however, it should be appreciated that machine 10 might include an excavator, a track loader, or still another type of machine. Implement 15 is shown as a blade, however, it will similarly be appreciated that a variety of different implements such as a bucket or the like might alternatively be used.

Undercarriage system 14 includes a drive sprocket 22, a rotatable idler 30, a track roller frame 28, and a ground engaging track 16. Track 16 may include one of two tracks positioned at opposite sides of machine 10 in a conventional manner. Accordingly, the present description of track 16 and associated components of undercarriage system 14 should be understood to refer similarly to a second track positioned at an opposite side of machine 10. Track 16 may include a track chain 17 having a plurality of track shoes 18 coupled together in track chain 17 and extending in an endless loop about drive sprocket 22 and idler 30. One or more carrier rollers 24 may be coupled with track roller frame 28 in a conventional manner, as may a plurality of lower rollers 26. Undercarriage system 14 is shown in the context of an oval track design, however, it should be appreciated that a high-drive track system or the like might be used without departing from the scope of the present disclosure.

Figure 2:
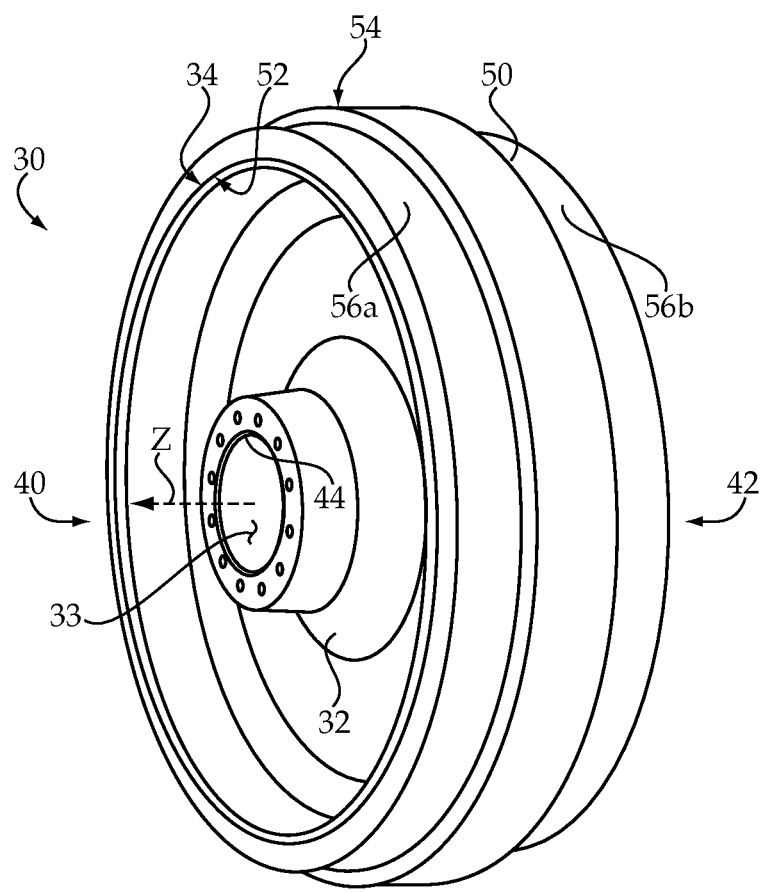
FIG. 2 is a perspective view of an idler for an undercarriage system in a track-type machine, according to one embodiment.

Referring also to FIG. 2, rotatable idler 30 may include a one-piece hub 32 defining an axis of rotation Z. Hub 32 may include an outer peripheral surface 34, an inner peripheral surface 44 defining an idler mounting bore 33, and a compound annular rim 50 coaxial with and capping one-piece hub 32. As used herein, the term "capping" should be understood to mean that rim 50 provides an outermost covering of idler 30 and overlies substantially all of outer peripheral surface 34. Thus, components positioned between an outer peripheral surface of an idler hub and a track contacting surface of the associated idler would not in and of themselves be understood as "capping" the idler hub. Rim 50 may include an inner rim surface 52, and a track contacting outer rim surface 54 having a crowned profile. A first axial side 40 of hub 32 is shown in FIG. 2, and a second axial side 42 may be substantially a mirror image of first axial side 40. Rim 50 may further include a first rim component 56a and a second rim component 56b, each of which may include approximately one-half of each of outer rim surface 54 and inner rim surface 52. Each of rim components 56a and 56b may include a stepped profile, in other words a stepped profile in an axial direction, the significance of which will be further apparent from the following description. As also further discussed herein, idler 30 and other contemplated embodiments may be uniquely configured for high durability and wear resistance based at least in part upon selection of suitable materials for hub 32 and rim 50, as well as the use of coupling strategies between rim 50 and hub 32, and geometry of the respective components.

Figure 3:
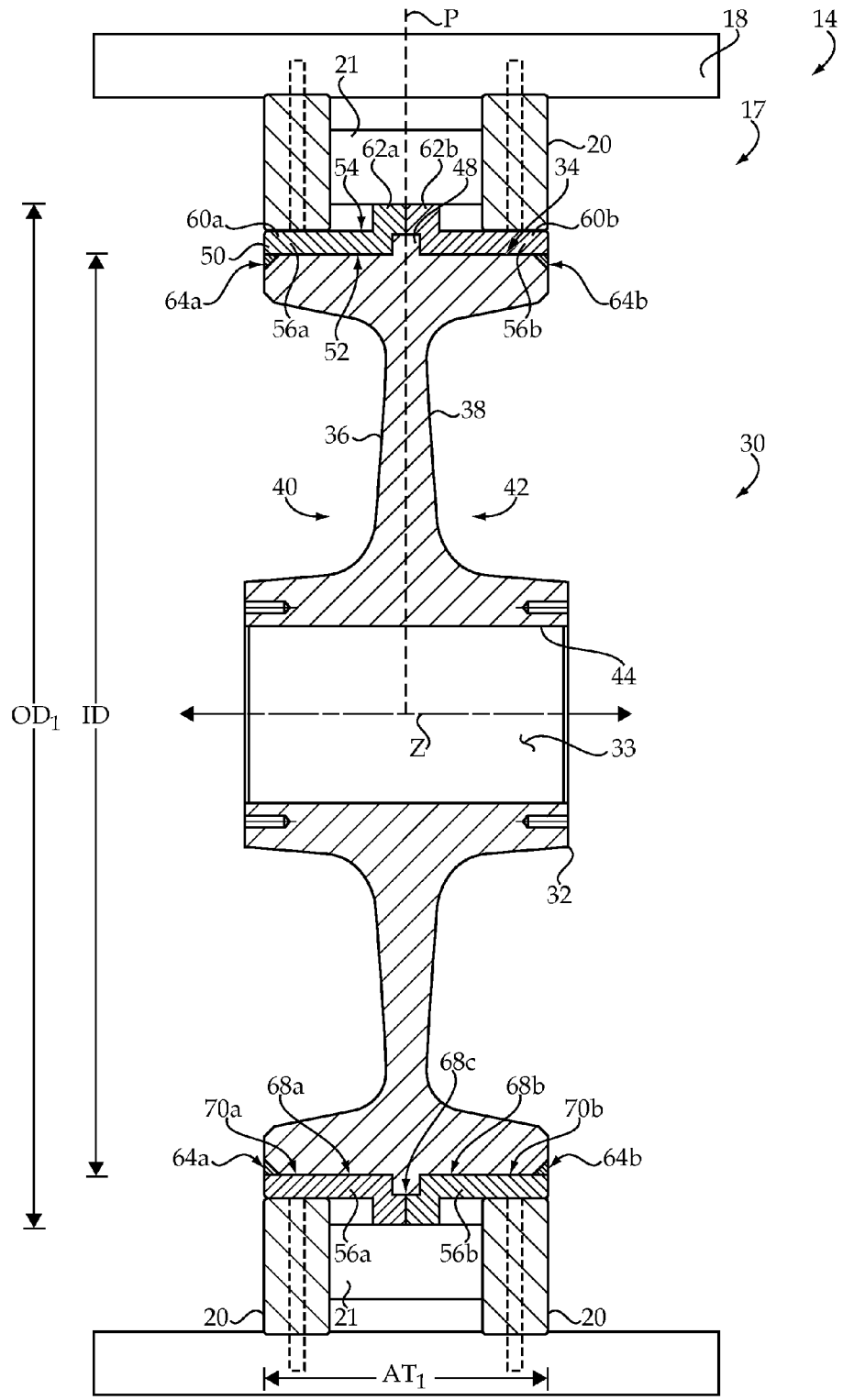
FIG. 3 is a sectioned view through a portion of an undercarriage system having an idler, according to one embodiment.

Turning now to FIG. 3, there is shown a sectioned view through a portion of undercarriage system 14 and in a section plane which includes a plane of axis of rotation Z. The configuration of idler 30 shown in FIG. 3 may be similar or identical at any other section plane which includes all of axis Z. Outer rim surface 54 of compound annular rim 50 is shown in contact with track pins 21 which couple together two sets of track links 20, which are in turn coupled with track shoes 18. Also shown in FIG. 3 is a first axial end surface 36 of hub 32 located on first axial side 40, and a second axial end surface 38 of hub 32 located on second axial side 42. It may be noted that each of axial side surfaces 36 and 38 includes a bathtub shaped profile of rotation about axis Z. Still further illustrated in FIG. 3 is a radially projecting outer spine 48 of hub 32. Outer spine 48 may include an annular configuration circumferential of axis Z, and may further be a continuous outer spine having a uniform cross sectional profile about axis Z, similar to what is shown in FIG. 3. Outer spine 48 may be positioned axially between first end surface 36 and second end surface 38, and may be concentric with bore 44. Rim components 56a and 56b may likewise be concentric with bore 44 and thus coaxial with hub 32.

Also shown in FIG. 3 are additional features of compound annular rim 50. As noted above, compound annular rim 50 may be coaxial with hub 32. Compound annular rim 50 may be understood as "compound" due at least in part to the fact that it is formed from multiple subcomponents such as first rim component 56a and second rim component 56b. As alluded to above, selection of certain materials for idler 30 is contemplated to provide enhanced durability and wear resistance. To this end, each of rim components 56a and 56b may be formed from a relatively higher hardness metallic material. Hub 32 may be formed of a relatively lower hardness metallic material. In one embodiment, hub 32 may include a casting formed from mild steel, and each of rim components 56a and 56b may include a machined casting or otherwise formed relatively harder steel. Example materials for rim components 56a and 56b include alloys such as 4340 steel, AISI 420 steel, AISI 440 steel, or Hadfield steel. The selection of suitable materials may be based at least in part upon intended service conditions, as further described herein. Such materials and associated selection and implementation are described herein in connection with idler 30, however, it should be appreciated that these teachings similarly apply to other embodiments described herein except where otherwise indicated.

As mentioned above, each of rim components 56a and 56b may include a stepped profile, as shown in FIG. 3. The stepped profile shown is relatively abruptly stepped, but need not be. In other embodiments, a more gradually stepped profile might be used. Rim components whose outer surface defines a uniform radius of curvature in an axial direction, however, would not likely be fairly considered to have a "stepped" profile as that term is intended to be understood herein. Each of rim components 56a and 56b may further include an outboard shoulder segment 60a and 60b, respectively, and an inboard crown segment 62a and 62b, respectively. Inboard crown segments 62a and 62b may abut another in a plane P. In one embodiment, rim components 56a and 56b may be mirror images of one another, and plane P may include a plane bisecting axis of rotation Z. Each of outboard shoulder segments 60a and 60b may be relatively tightly fitted upon outer peripheral surface 34 of hub 32 and may be located axially outward of radially projecting outer spine 48. Each of inboard crown segments 62a and 62b may be relatively loosely fitted, i.e. slip fitted, upon outer peripheral surface 34 and may axially overlap radially projecting outer spine 48. In one embodiment, each of outboard shoulder segments 60a and 60b may be interference fitted upon outer peripheral surface 34. To this end, idler 30 may include a first interference coupling 70a between rim component 56a and hub 32, and a second interference coupling 70b between rim component 56b and hub 32. Each of rim components 56a and 56b may also be relatively tightly fitted in abutment against outer spine 48, and relatively loosely fitted in abutment against each other. Another way to understand this principle is that outer spine 48 may be held in compression, or "sandwiched" axially between rim components 56a and 56b.

An axial thickness dimension $AT_1$ is defined by compound annular rim 50 and may be between about 200 millimeters and about 250 millimeters in one embodiment. Axial thickness $AT_1$ may more particularly be between about 215 millimeters and about 225 millimeters, and still more particularly equal to about 220 millimeters. It may be noted that outboard shoulder segments 60a and 60b may each comprise a relatively greater proportion of axial thickness $AT_1$ than do inboard crown segments 62a and 62b. Stated another way, outboard shoulder segments 60a and 60b may each include a first axial length/thickness, and inboard crown segments 62a and 62b may each include a second axial length/thickness greater than the first axial length/thickness. The axial length/thickness of each of inboard crown segments 62a and 62b may be equal to about 47.5 millimeters in one embodiment, with the remainder of axial thickness $AT_1$ comprised by outboard shoulder segments 60a and 60b together, and varying based upon an axial thickness of outer spine 48. Compound annular rim 50 may further include an inner rim surface 52 abutting outer peripheral surface 34 of hub 32. A radial thickness of rim components 56a and 56b, within outboard shoulder segments 60a and 60b, may be between about 20 mm and about 100 mm. Inner rim surface 52 may include a total of three concentric cylindrical surface segments, including a first cylindrical surface segment 68a located on outboard shoulder segment 60a, a second cylindrical surface segment 68b located on outboard shoulder segment 60b, and a middle cylindrical surface segment 68c located in part upon inboard crown segment 62a and also in part upon inboard crown segment 62b.

Inner rim surface 52, and more particularly surface segments 68a and 68b may define an inner diameter dimension ID which may be equal to between about 625 mm and about 675 mm, more particularly equal to about 650 mm, and still more particularly equal to about 650.00 mm plus or minus tolerances of 0.00 mm and 0.05 mm, respectively. Outer peripheral surface 34 may define an outer diameter dimension also indicated generally via ID, equal to between about 625 mm and about 675 mm, more particularly equal to about 650 mm, and still more particularly equal to about 650.13 mm plus or minus tolerances of 0.05 mm and 0.00 mm, respectively. Track contacting outer rim surface 54, and more particularly portions of surface 54 upon inboard crown segments 62a and 62b, may define an outer diameter dimension $OD_1$ which may be equal to between about 645 mm and about 775 mm. As used herein, the term "about" may be understood in the context of a number of significant digits. Accordingly, about 650 mm means between 645 mm and 654 mm, and so on, except where otherwise indicated. Compound annular rim 50 may also be welded to hub 32. In one embodiment, a first annular weld 64a which may include a circular edge weld attaches outboard shoulder segment 60a to hub 32, and a second annular weld 64b which may also include a circular edge weld attaches outboard shoulder segment 56b to hub 32. In one embodiment, idler 30 may include a total of two welds, comprised by the two welds 64a and 64b attaching compound annular rim 50 to hub 32. Idler 30 may further consist essentially of rim components 56a and 56b, hub 32, and material of welds 64a and 64b.

Figure 4:
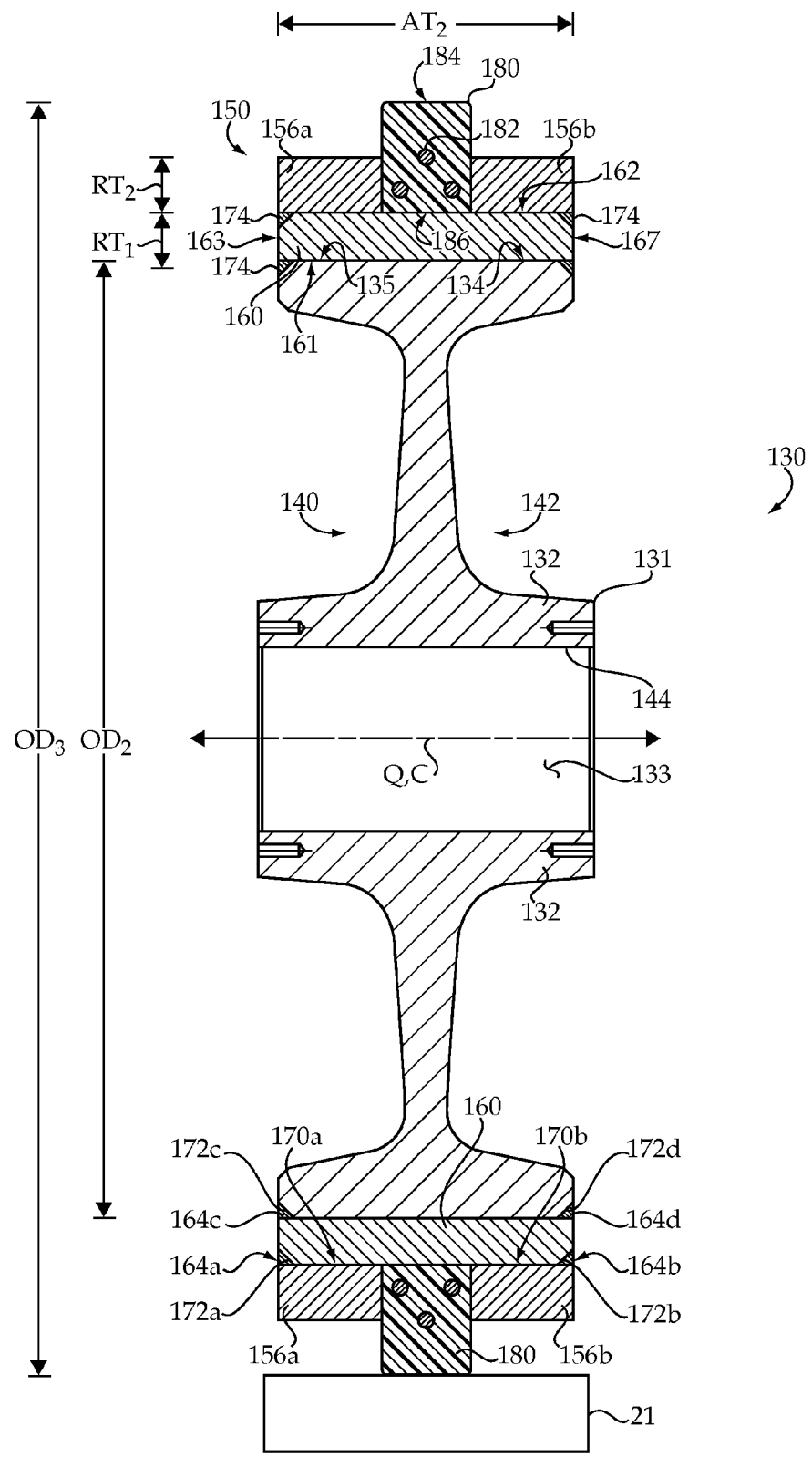
FIG. 4 is a sectioned view through an idler, according to another embodiment.

Turning now to FIG. 4, there is shown an idler 130 for an undercarriage system in a track-type machine according to another embodiment. Idler 130 might be used in undercarriage system 14, or in any of the other undercarriage system and machine types contemplated herein. Idler 130 may include a one-piece hub 132 having an outer peripheral surface 134, an inner peripheral surface 144 defining an idler mounting bore 133, and a compound rim assembly 150 mounted upon hub 132. Compound rim assembly 150 and hub 132 may be understood as two components of an idler body 131. Compound rim assembly 150 may include a first annular track contacting rim 156a, a second annular track contacting rim 156b, and a track guiding ring 180. One or more welds may attach compound rim assembly 150 to hub 132, as further described herein. Idler 130 may have certain material properties similar to those properties described in connection with the foregoing embodiment, but having certain differences. Hub 132 may be formed of a relatively lower hardness metallic material, and certain parts of compound rim assembly 150 may be formed of a relatively higher hardness metallic material, but other components formed of non-metallic materials. Hub 132 may be formed of a relatively lower hardness metallic material, annular track contacting rims 156a and 156b may be formed of a relatively higher hardness metallic material, and track guiding ring 162 may be formed of a non-metallic material. In one embodiment, track guiding ring 180 may include a rubber material, having embedded reinforcements 182 such as metallic fiber reinforcements or the like. The use of a non-metallic material such as rubber may reduce noise resulting from ring 162 contacting track components such as track pins.

Compound rim assembly 150 may further include a one-piece annular base 160 configured for mounting rim assembly 150 upon outer peripheral surface 134. One-piece annular base 160 may be formed of a relatively lower hardness metallic material, having a hardness similar to hub 132, but not necessarily so, and includes a cylindrical inner surface 161 defining a center axis C. Center axis C may be overlapping with an axis of rotation Q of idler 130 defined by inner peripheral surface 144. Base 160 may further include a cylindrical outer surface 162 concentric with cylindrical inner surface 161, a first axial end surface 163, and a second axial end surface 167. Base 160 may also include an axial thickness $AT_2$ extending from first axial end surface 163 to second axial end surface 167, and a radial thickness $RT_1$ extending from inner cylindrical surface 161 to outer cylindrical surface 162 which is less than axial thickness $AT_2$. Base 160 may also include an interference coupling 135 with hub 132.

First annular track contacting rim 156a may be positioned upon outer cylindrical surface 162 at a location adjacent first axial end surface 163, and second annular track contacting rim 156b may be positioned upon outer cylindrical surface 162 at a location adjacent second axial end surface 167. Axial thickness $AT_2$ may be configured similarly to axial thickness $AT_1$ of idler 30. Radial thickness $RT_1$ may vary based upon a radial thickness $RT_2$ of rims 156a and 156b. In one embodiment, $RT_2$ may be configured similarly to the radial thickness of rim components 56a and 56b, described above. It will thus be understood that $RT_1$ might vary between a relatively greater thickness for a larger diameter of hub 132, and a relatively lesser thickness for a smaller diameter of hub 132. Hub 132 might include an outer diameter $OD_2$ between about 600 mm and about 700 mm in certain embodiments. An outer diameter $OD_3$ defined by an outer peripheral surface 184 of ring 180 may be between about 700 mm and about 800 mm, and may be equal to about 740 mm in one embodiment. Each of first annular track contacting rim 156a and second annular track contacting rim 156b may be welded to annular base 160. Track guiding ring 180 may be trapped axially between first and second rims 156a and 156b such that it abuts outer cylindrical surface 162 of base 160. As noted above, track guiding ring 180 may be formed of a non-metallic material, and projects radially outward of first and second rims 156a and 156b.

Rim assembly 150 may further include a first interference coupling 170a between base 160 and first rim 56a, and a second interference coupling 170b between base 160 and second rim 156b. Track guiding ring 180 may include an inner peripheral surface 186 slip fitted upon outer cylindrical surface 162, not actually attached to base 160, and thus held in place upon base 160 by way of being trapped between rim 156a and rim 156b. Also shown in FIG. 4 is a track pin 21 in contact with track guiding ring 180. Over the course of a service life of idler 130, it is expected that track guiding ring 180 may wear such that track pin 21 and other associated components of the track system may actually migrate relative to rims 156a and 156b until rims 156a and 156b begin to contact pins 21, or in other embodiments ride upon links 20. The description herein of "track pins" should be understood to refer to any type of suitable known track pin, including cartridge pins, and also track pins upon which a fixed or rotating bushing is positioned.

As discussed above, base 160 may be interference fit upon hub 132, and each of rims 156a and 156b may be interference fit upon base 160 via interference couplings 170a and 170b, respectively. In addition, welding may be used to couple together components of compound rim assembly 150, and to attach compound rim assembly to hub 132. To this end, a first weld 164a attaches rim 156a to base 160, and a second weld 164b attaches rim 156b to base 160. Base 160 may further include a first bevel surface 172a extending from outer cylindrical surface 162 to first axial end surface 163, and a second bevel surface 172b extending from outer cylindrical surface 162 to second axial end surface 167. First weld 164a may include an annular weld such as a circular edge weld and including a weld material shown generally via reference numeral 174 contacting first bevel surface 172a and also contacting rim 156a. Second weld 164b may also include an annular weld such as a second circular edge weld including weld material 174 contacting second bevel surface 172b and also contacting rim 156b. A third bevel surface 172c and a fourth bevel surface 172d may be formed on hub 132 and extend from outer peripheral surface 134 to first and second axial sides 140 and 142, respectively. Third and fourth welds 164c and 164d, also potentially circular edge welds, attach base 160 to hub 12. All the welds described herein may be formed by deep penetration welding procedures.

Idler 130 might include a newly manufactured idler shipped for installation into an existing undercarriage system of a track-type machine, or assembled with a newly manufactured track-type machine at the factory. Idler 130 may also include a remanufactured idler, where hub 132 includes a reusable hub, which is equipped with a new compound rim assembly at periodic service intervals. In this vein, compound rim assembly 150 may include a stand alone aftermarket component which is provided for replacement of a previously used compound rim assembly. In certain instances, upon track rebuild of an existing track-type machine using an idler such as idler 130, welds 164c and 164d may be machined or burned out, and interference coupling 135 reversed in preparation for installation of a substitute, new compound rim assembly similar to compound rim assembly 150 but not having yet experienced a service life. An interference coupling may then be established between the substitute compound rim assembly and the existing reusable hub in preparation for another service life of idler 130. Where provided as an aftermarket replacement part, compound rim assembly 150 may consist essentially of annular base 160, first and second rims 156a and 156b, weld material 174, and track guiding ring 180. A compound rim assembly provided as an aftermarket replacement part will thus be understood to include a total of two welds, namely, welds 164a and 164b, in certain embodiments. When rim assembly 150 is installed for service upon hub 132, the completed idler might include a total of four welds, including in addition welds 164c and 164d.

Figure 5:
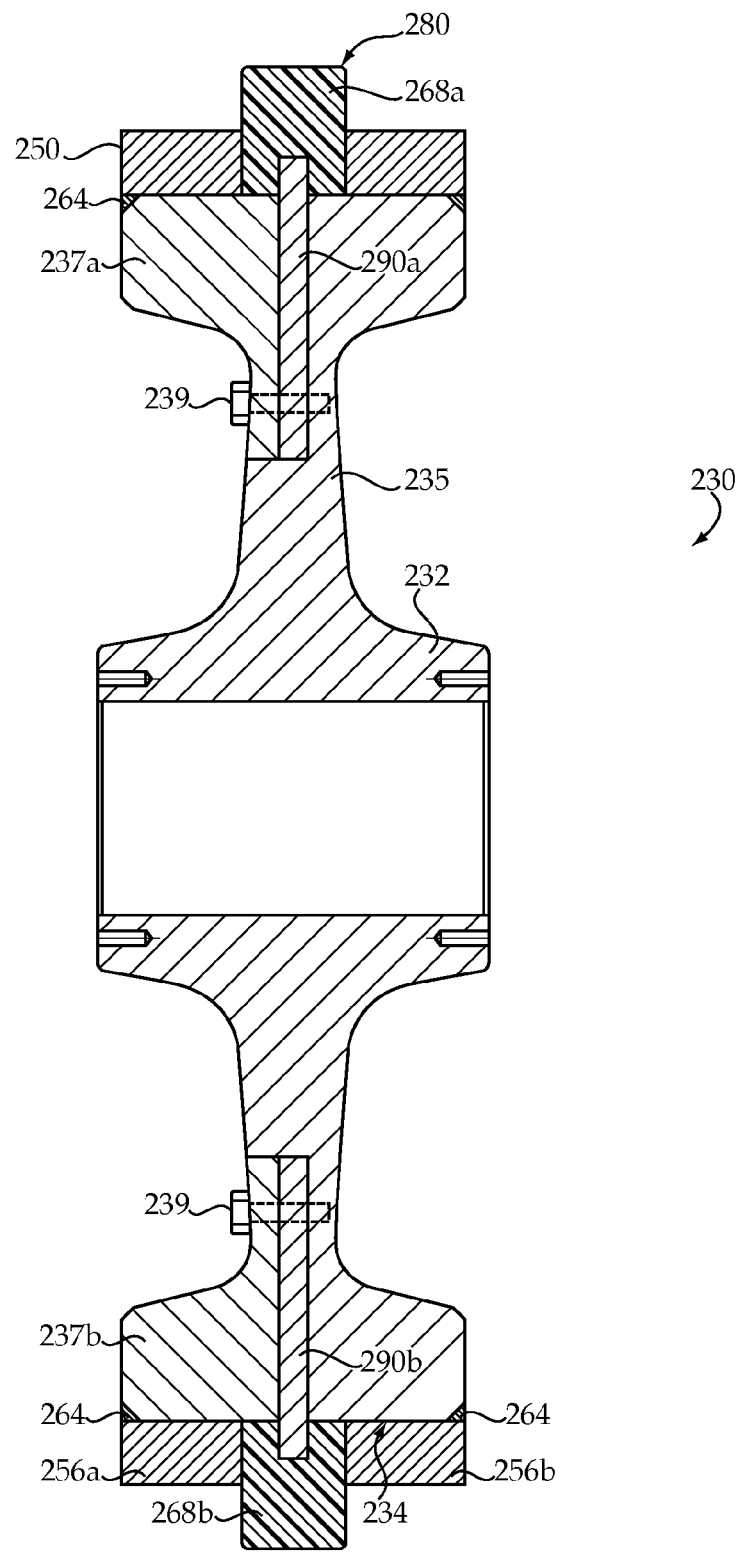
FIG. 5 is a sectioned view through an idler according to yet another embodiment.

Referring now to FIG. 5, there is shown a rotatable idler 230 for an undercarriage system in a track-type machine having applications similar to the embodiments described above. Idler 230 may include a newly manufactured idler, but might also include a remanufactured idler as further described herein. Idler 230 may include a hub 232 which is a multi-piece hub having a main hub body 235, a plurality of removable body segments 237a and 237b, and a plurality of bolts 239 coupling body segments 237a and 237b to main hub body 235. In one practical implementation strategy, the plurality of removable body segments may include a number of body segments between two and six, although the present disclosure is not thereby limited. In FIG. 5, body segments 237a and 237b will be understood to curve in and out of the page, and thus may be understood as radial segments which when coupled with main hub body 235 together define an annular configuration. Hub 232 may be formed of a relatively lower hardness metallic material. A compound rim assembly 250 may be coupled with hub 232, and in one embodiment may include a first annular rim 256a which is welded via an annular weld such as a circular edge weld 264 to each of removable body segments 237a, 237b, and such other removable body segments as might be used. Hub 232 may further include an outer hub surface 234 upon which first annular rim 256a and a second annular rim 256b are interference fitted. Rims 256a and 256b may be formed of a relatively higher hardness metallic material. It may be noted that outer peripheral surface 234 may be located in part upon main hub body 235 and also in part upon removable body segments 237a and 237b. In the embodiment of FIG. 5, a non-metallic track guiding ring 280 is trapped between rims 256a and 256b.

In contrast to the embodiment of FIG. 4, track guiding ring 280 may include a segmented ring having a plurality of radial ring segments, two of which are shown and identified via reference numerals 268a and 268b. A number of radial ring segments in idler 230 may be between two and six, but the present disclosure is not thereby limited. A plurality of connector bars 290a and 290b are coupled with radial segments 268a and 268b, respectively. A number of connector bars 290a, 290b coupled with radial segments 268a, 268b, may include a number of connector bars per each radial segment equal to at least two. In one embodiment, connector bars 290a, 290b, may be irreversibly coupled to radial segments 268a, 268b, such as by way of being integrally molded with a rubber material from which ring 280 is formed, and reversibly coupled to hub 232. Connector bars 290a and 290b may be trapped between body segments 237a and 237b and main hub body 235 in one embodiment. It will thus be understood that loosening bolts 239 can allow removal of an assembly comprised of rim 256a and the removable body segments welded thereto. This might be done to enable replacement of track guiding ring 280, and reinstallation of segments 237a, 237b and rim 256a. Alternatively to merely replacing track guiding ring 280, a replacement rim might be swapped for rim 256a, and another replacement rim swapped for rim 256b.

INDUSTRIAL APPLICABILITY

Returning to the embodiment of FIGS. 2 and 3, it will be recalled that compound annular rim 50 caps hub 32. Over the course of a service life of idler 30, material of rim components 56a and 56b may wear away. Prior to or upon reducing outer diameter of $OD_1$, by a certain amount, such as approximately two inches, it may be desirable to repair and/or remanufacture idler 30. Remanufacturing idler 30 may include removing compound rim 50 such as by machining or burning out welds 64a and 64b. Interference couplings 70a and 70b may be reversed to enable removal of rim components 56a and 56b, and reinstallation of new rim components. During capping hub 32 with replacement rim components, outer spine 48 may be sandwiched between the replacement rim components, and welds 64a and 64b formed. Establishing interference couplings 70a and 70b may be understood as reversibly coupling hub 32 with rim components 56a and 56b, whereas welds 64a and 64b may be understood to irreversibly couple the respective components. The remanufactured idler may then be returned to service.

Related techniques may be used to remanufacture an existing idler which includes a conventional one-piece casting. Those skilled in the art will be familiar with idlers of the type where a one-piece idler body is used. Such known idlers often include a central annular crown which serves to contact, tension, and guide an associated track. Over time, the center crown can wear, as may other outer surfaces of the idler. Strategies similar to those described above employing hard facing or other resurfacing techniques were previously used to repair idlers removed from service. It has been discovered that such techniques, while being quite labor intensive, also tend to result in an idler which is more susceptible to wear and has a reduced service life than new idlers. One of the reasons for this relates to inherent limitations of certain resurfacing techniques. Resurfacing can often require the addition of numerous layers of resurfacing material one at a time. Since each layer is deposited in the form of molten metallic material, heating of underlying layers inherently occurs. This tends to limit the types of materials which can be used in the hard facing or other resurfacing process, and can change the physical characteristics of materials comprising the underlying layers. As a result, engineers have previously been given little choice in how to go about repairing idlers of certain types.

The present disclosure allows idler repair to be driven not so much by the limitations of a particular process, but instead by the intended service applications of the subject idler to be repaired. Those skilled in the art will be familiar with different material compositions which are best suited to different operating environments for undercarriage system components in track-type machines. For example, certain materials may well suited to sandy operating environments, whereas other materials may be suitable for rocky operating environments. Similarly, different load bearing requirements, speed of rotation, temperature ranges experienced, and still other factors may be best addressed by different materials. Despite knowledge of different behavior of different materials, engineers have continued to produce remanufactured idlers having properties different to and often inferior from what would ideally be available. Thus, in the case of idler 30 and the other embodiments herein, rather than being forced to settle upon inferior materials due to process limitations, rim components 56a and 56b may be formed from materials best suited to a particular service application. Where an idler such as idler 30 is to be remanufactured multiple times, and its service environment changed, rim components 56a and 56b may be substituted for rim components which were used in the earlier service life but formed of a different material.

As alluded to above, idler 30 might include an idler originally manufactured as a one-piece casting, but remanufactured as a multi-component idler as shown. In preparation for remanufacturing an idler comprised of a single piece casting, it may be desirable to remove material from an outer periphery of the idler body to appropriate dimension the idler body for installation of rim components 56a and 56b, and also to provide clean and trued surfaces for establishing interference couplings 70a and 70b, and forming welds 64a and 64b. To this end, the outer surface of the existing idler may be reduced in diameter by removing material, but may be machined such that material remains to form/preserve outer spine 48.

Remanufacturing of idlers according to the embodiments of FIGS. 4 and 5 may take place in a manner somewhat different from the embodiment of FIGS. 2 and 3. In the case of the embodiment of FIG. 4, as noted above the entire compound rim assembly 150 may be removed from hub 132, and a new compound rim assembly positioned thereon and appropriately attached. In the FIG. 5 embodiment, as discussed above track guiding ring 280 might be replaced and/or rims 256a and 256b might be replaced.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A compound rim assembly for a rotatable idler in an undercarriage system of a track-type machine comprising:

a one-piece annular base configured for mounting the compound annular rim assembly upon an outer peripheral surface of an idler hub, the one-piece annular base being formed of a relatively lower hardness metallic material, and having a cylindrical inner surface defining a center axis, a cylindrical outer surface concentric with the cylindrical inner surface, and a first and a second axial end surface;

the one-piece annular base further including an axial thickness between the first and second axial end surfaces, and a radial thickness between the inner and outer cylindrical surfaces, the radial thickness being less than the axial thickness;

a first annular track contacting rim positioned upon the outer cylindrical surface at a location adjacent the first axial end surface, and a second annular track contacting rim positioned upon the outer cylindrical surface at a location adjacent the second axial end surface, each of the first and second annular track contacting rims being formed of a relatively higher hardness metallic material and being welded to the one-piece annular base; and a track guiding ring trapped axially between the first and second annular track contacting rims and abutting the outer cylindrical surface of the one-piece annular base, the track guiding ring being formed of a non-metallic material and projecting radially outward of the first and second annular track contacting rims.

2. The compound rim assembly of claim 1 further comprising a first interference coupling between the one-piece annular base and the first annular track contacting rim, and a second interference coupling between the one-piece annular base and the second annular track contacting rim.

3. The compound rim assembly of claim 2 further comprising a first circular edge weld attaching the first annular track contacting rim to the one-piece annular base, and a second circular edge weld attaching the second annular track contacting rim to the one-piece annular base.

4. The compound rim assembly of claim 3 wherein the track guiding ring includes a one-piece ring slip fitted upon the outer cylindrical surface.

5. The compound rim assembly of claim 3 having a total number of welds equal to two.

6. The compound rim assembly of claim 3 wherein:
the one-piece annular base includes a first beveled surface extending from the outer cylindrical surface to the first axial end surface, and a second beveled surface extending from the outer cylindrical surface to the second axial end surface; and
the first circular edge weld includes weld material contacting the first beveled surface and the first annular track contacting rim, and the second circular edge weld includes weld material contacting the second beveled surface and the second annular track contacting rim.

7. The compound rim assembly of claim 6 wherein the compound rim assembly consists essentially of the one-piece annular base, the first and second annular track contacting rims, the weld material, and the track guiding ring.

8. The compound rim assembly of claim 3 wherein:
the axial thickness is equal to between about 200 millimeters and about 300 millimeters; and
the track guiding ring includes an outer ring surface defining an outer diameter dimension of the compound rim assembly, and the outer diameter dimension is equal to between about 700 millimeters and about 800 millimeters.

9. A remanufactured idler for an undercarriage system in a track-type machine comprising:
a hub including an outer peripheral surface, an inner peripheral surface defining an idler mounting bore, and a compound rim assembly mounted upon the hub, the compound rim assembly including a first annular track contacting rim, a second annular track contacting rim, and a track guiding ring;
a weld attaching the compound rim assembly to the hub;
the hub being formed of a relatively lower hardness metallic material, the first and second annular track contacting rims being formed of a relatively higher hardness metallic material, and the track guiding ring being formed of a non-metallic material; and the track guiding ring being trapped axially between the first and second annular track contacting rims, and projecting radially outward of the first and second annular track contacting rims;
wherein the weld includes a first circular edge weld, and further comprising a second circular edge weld;
wherein the compound rim assembly further includes a one-piece annular base mounted upon the outer peripheral surface, and wherein the first and second circular edge welds attach the one-piece annular base to the hub.

10. The remanufactured idler of claim 9 wherein the hub further includes a first and a second axial side, and wherein the outer peripheral surface includes a cylindrical surface and extends from the first axial side to the second axial side.

11. The remanufactured idler of claim 10 further comprising a third circular edge weld attaching the first annular track contacting rim to the one-piece annular base, and a fourth circular edge weld attaching the second annular track contacting rim to the one-piece annular base.

12. The remanufactured idler of claim 11 having a total number of welds equal to four.

13. The remanufactured idler of claim 9 wherein the track guiding ring includes a one-piece ring.

14. The remanufactured idler of claim 9 wherein the first and second circular edge welds attach the first and second annular track contacting rims, respectively, to the hub.

15. An undercarriage system for a track-type machine comprising:
a ground engaging track including a plurality of track shoes, a plurality of track links coupling together the track shoes in an endless track chain, and a plurality of track pins coupled with the track links;
an idler for the ground engaging track including an idler body having a hub formed of a relatively lower hardness metallic material, and a compound rim assembly mounted upon the hub, the compound rim assembly including a first annular track contacting rim, a second annular track contacting rim, and a track guiding ring;
a weld attaching the compound rim assembly to the hub;
the hub being formed of a relatively lower hardness metallic material, the first and second annular track contacting rims being formed of a relatively higher hardness metallic material, and the track guiding ring being formed of a non-metallic material; and
the track guiding ring being trapped axially between the first and second annular track contacting rims, and projecting radially outward of the first and second annular track contacting rims such that the track guiding ring contacts the plurality of track pins;
wherein:
the compound rim assembly includes a one-piece annular base having a cylindrical inner surface interference fitted upon the hub, and a cylindrical outer surface;
each of the first and second annular track contacting rims are interference fitted upon the cylindrical outer surface; and
the weld includes a first circular edge weld, the idler further including second circular edge weld, and the first and second circular edge welds attaching the first and second annular track contacting rims to the one-piece annular base, respectively.

* * * * *

UNITED STATES PATENT AND TRADEMARK OFFICE
CERTIFICATE OF CORRECTION

| | | |
|---|---|---|
| PATENT NO. | : 8,770,677 B2 | Page 1 of 1 |
| APPLICATION NO. | : 12/974474 | |
| DATED | : July 8, 2014 | |
| INVENTOR(S) | : Alexei P. Yelistratov | |

It is certified that error appears in the above-identified patent and that said Letters Patent is hereby corrected as shown below:

In the Claims,

Column 12, line 58, in Claim 15, delete "including second" and insert -- including a second --.

Signed and Sealed this
Eighth Day of September, 2015

Michelle K. Lee
*Director of the United States Patent and Trademark Office*